(12) United States Patent
Bescherer

(10) Patent No.: US 7,621,232 B2
(45) Date of Patent: Nov. 24, 2009

(54) REMOVABLE BASE FOR A BIRD FEEDER

(75) Inventor: Robert E. Bescherer, Bristol, RI (US)

(73) Assignee: Aspects, Inc., Warren, RI (US)

( * ) Notice: Subject to any disclaimer, the term of this patent is extended or adjusted under 35 U.S.C. 154(b) by 570 days.

(21) Appl. No.: 11/069,878

(22) Filed: Mar. 1, 2005

(65) Prior Publication Data

US 2005/0211177 A1   Sep. 29, 2005

Related U.S. Application Data

(60) Provisional application No. 60/550,208, filed on Mar. 4, 2004.

(51) Int. Cl.
 *A01K 39/01* (2006.01)
(52) U.S. Cl. .................................... 119/57.8; 119/52.2
(58) Field of Classification Search ............... 119/57.8, 119/57.9, 52.2, 52.3, 51.01, 52.1; 292/32, 292/33, 41, 42, 175; 403/325, 327, 328
See application file for complete search history.

(56) References Cited

U.S. PATENT DOCUMENTS

| | | | |
|---|---|---|---|
| 3,115,865 A | 12/1963 | Parkes et al. | |
| 3,244,150 A | 4/1966 | Blair | |
| 4,829,934 A * | 5/1989 | Blasbalg | 119/57.8 |
| 5,215,039 A * | 6/1993 | Bescherer | 119/57.8 |
| 5,463,979 A | 11/1995 | Fasino | 119/54 |
| 5,465,683 A | 11/1995 | Reisdorf | 119/52.2 |
| 5,699,753 A | 12/1997 | Aldridge, III | |
| 5,701,841 A | 12/1997 | Fasino | 119/52.2 |
| 5,829,382 A | 11/1998 | Garrison | 119/52.2 |
| 6,543,383 B1 * | 4/2003 | Cote | 119/57.8 |
| 6,701,867 B1 * | 3/2004 | Garrison | 119/57.8 |
| 6,957,626 B2 | 10/2005 | Ela et al. | |
| 2003/0135950 A1 * | 7/2003 | Dove | 15/230.11 |

* cited by examiner

*Primary Examiner*—Michael R Mansen
*Assistant Examiner*—Joshua J Michener
(74) *Attorney, Agent, or Firm*—Barlow, Josephs & Holmes, Ltd.

(57) ABSTRACT

A bird feeder has a tubular body member having an open bottom end. A base member interfittingly engages the bottom end of the tubular body member The base member is releasably secured to the tubular body member by the engagement of a spring-biased pin that communicates with an aperture through the wall of the tubular body member. Preferably, there are two spring-biased locking pins on opposing sides of the feeder with corresponding lock eye apertures. User manipulatable buttons, which are mechanically linked to the locking pins, are depressed to cause the locking pins to retract to permit releasable attachment of the tubular body member of the feeder thereon enabling easy access to the interior of the feeder.

9 Claims, 6 Drawing Sheets

REMOVABLE BASE FOR A BIRD FEEDER

CROSS-REFERENCE TO RELATED APPLICATION

This application claims priority to earlier filed U.S. Provisional Application Ser. No. 60/550,208, filed Mar. 4, 2004, the contents of which are incorporated herein by reference.

BACKGROUND OF THE INVENTION

1. Field of the Invention

The present invention generally relates to bird feeders, namely, tubular bird feeders. More specifically, the present invention relates to bases for such tubular bird feeders.

2. Background of the Related Art

In the bird feeder industry, tubular bird feeders are very well known. These feeders include a tubular main feed body which is commonly transparent or translucent so the amount of feed remaining therein can be easily seen. Feed ports in the tubular body permit birds to gain access to the feed therein. A tubular bird feeder also typically includes a number of perches routed through or attached to the tubular body to support a bird during feeding through one of the feed ports.

A tubular bird feeder typically has an open top and bottom end. The top end is covered by a removable cap so feed may be introduced into the tubular body. Bails are also provided so the feeder can be hung from a support. The bottom of the main tubular body is also closed, typically permanently, by a bottom base or cap. This base is usually screwed on or riveted to the bottom of the tubular main body to keep it closed. A post mount can be provided in the bottom of the bottom cap. The bases of prior art tubular bird feeders usually extend up into the tubular body. The top surface of the base of the feeder is commonly tapered or angled in some fashion to direct feed toward one or more of the feed ports at the lowermost portion of the tubular main body. This ensures that birds can gain access to all of the feed within the tubular feeder.

These known tubular feeders suffer from various problems that make them difficult to maintain. Remaining amounts of feed typically accumulate at the bottom of the feeder. When this feed mixes with rain, and the like, the feed at the lower portion of the feeder becomes packed and dirty making it difficult, if not impossible, for birds to access it. Moreover, once the feed is wet and/or dirty, birds may not even wish to consume it. Since the bases of these known tubular feeders are secured to the bottom of the feeder, they are difficult to remove. If a base is permanently secured to the bottom of the feeder, it will not be able to be removed. More likely, threaded fasteners are used to secure the base to bottom of the tubular main body. These fasteners require tools, such as a screwdriver or wrench, to remove the base for cleaning the feeder. The requirement of tools increases the burden of cleaning a feeder and further makes a bird feeder owner less likely to clean their feeder.

Therefore, there is a need for a bird feeder to be able to be quickly and easily cleaned. There is a specific need for an easily removable base for easy access to the bottom of the feeder.

SUMMARY OF THE INVENTION

The present invention provides a solution to the problems associated with prior art tubular bird feeders. The bird feeder of the present invention includes a new and novel base that is quickly and easily removable from the bottom of the main tubular body of the feeder. In general, the present invention provides a new base that is releasably secured to the bottom of the feeder.

More specifically, the present invention includes a tubular body member having an open bottom end where the base member is interfittingly engaged with the bottom end of the tubular body member. The base member is releasably secured to the tubular body member by the engagement of a spring-biased pin that communicates with an aperture through the wall of the tubular body member. Preferably, there are two spring-biased locking pins on opposing sides of the feeder with corresponding lock eye apertures. User manipulatable buttons are linked to the locking pins to cause them to retract to permit releasable attachment of the tubular body member of the feeder thereon.

An object of the present in invention is the provision for a bird feeder that has an easily removed base.

Another object of the present invention is the provision for a bird feeder that is easy to clean and maintain.

Yet another object of the present invention is the provision for a bird feeder having a removable base with spring-biased locking members.

Yet another object of the present invention is the provision for a bird feeder with a base that can be removed without using tools.

BRIEF DESCRIPTION OF THE DRAWINGS

These and other features, aspects, and advantages of the present invention will become better understood with reference to the following description, appended claims, and accompanying drawings where:

DESCRIPTION OF THE PREFERRED EMBODIMENT

Figure 1:
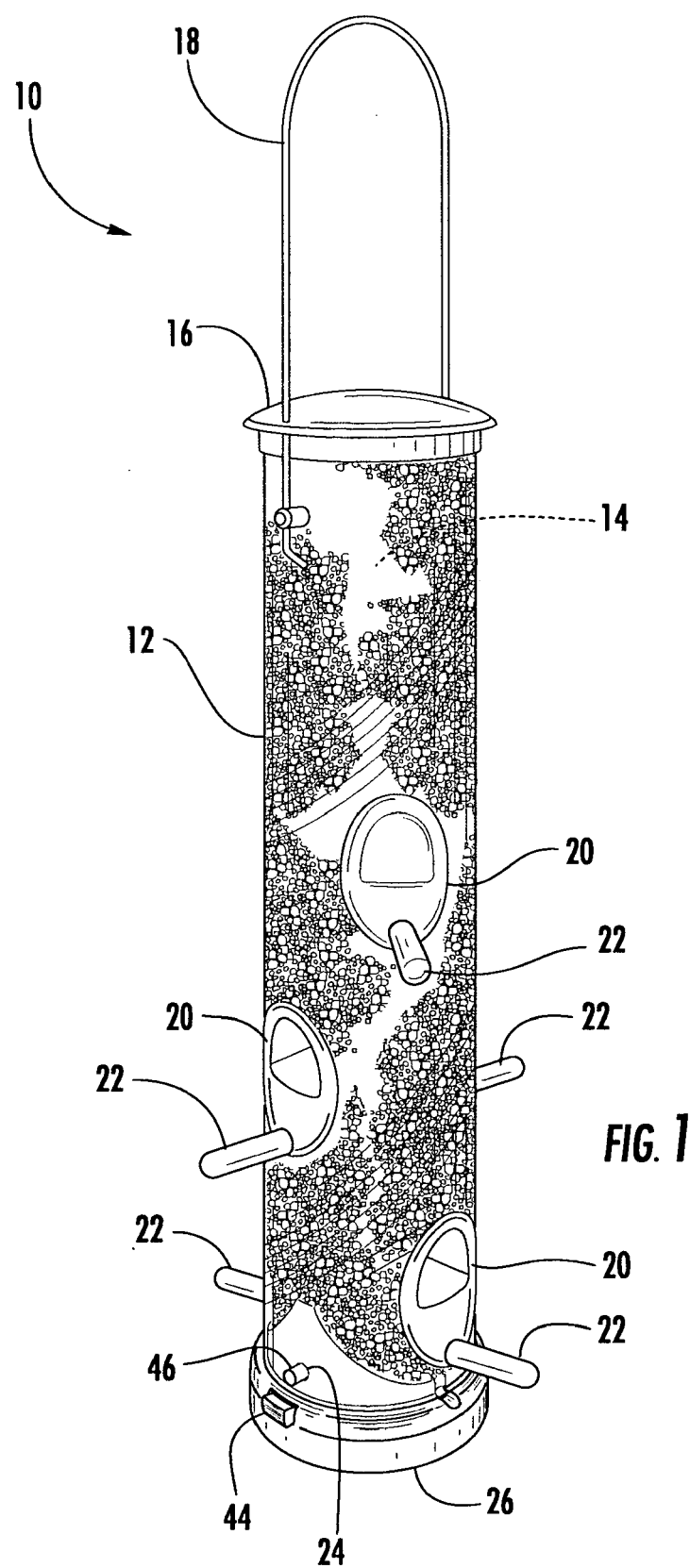
FIG. 1 is a perspective view of a bird feeder showing the preferred embodiment of the present invention.

Referring now to FIG. 1, a bird feeder exhibiting the preferred embodiment of the present invention is shown generally at 10. The bird feeder 10 has a tubular body member 12 having open top and bottom ends. The space enclosed by the body member 12 serves as a reservoir for holding bird food 14, such as seed. Although the shape of the body member shown is cylindrical, the cross-section shape of the body member can be other shapes, such as a square, octagonal, or triangular. The present invention is intended to cover all tubular-type bird feeders regardless of the geometric shape of the body. Enclosing the top end of the body member 12 is a top cover 16. The top cover 16 prevents water and debris from entering the body member 12 and also deters vermin, such as squirrels, from gaining access to the bird seed 14 contained therein. The top cover 16 is releasably secured to the body member 12 so that the bird feeder 10 may be refilled with bird seed 14 as needed. Extending from the top cover 16 is a bail 18. The bail 18 is provided as a convenient point from which to secure the bird feeder 10 to a tree, pole, house, or any other desired location. Although the bail 18 shown is wire loop other structures could be used such as a hook, an eye-bolt, or other structure as is known in the art.

Spaced around the outer surface of the body member 10 are a number of feed access points 20. The configuration and number of feed access points many be varied as desired. The feed access points 20 are mounted to the body member 12 to a hole punched therethrough so that birds may access the bird seed 14 contained therein. Corresponding perches 22 extend from the feed access point 20 for birds to have a location on which rest while feeding.

Near the bottom end of the body member 12 are a number of lock eyes 24. The lock eyes 24 are for retaining the base member 26 to the body member 12, described more fully below.

Enclosing the bottom end of the body member 12 is a base member 26. The base member 26 is releasably secured (the structures and procedures for which will be more fully described below) to the body member 12. The base member 26 keeps the bird seed 14 from draining out the bottom end of the body member 12 and also serves as a stand or platform for when the bird feeder 10 is not being hung from the bail 18 but is mounted on a post (not shown). This feature is convenient for when the owner desires to clean and refill the bird feeder 10.

Figure 2:
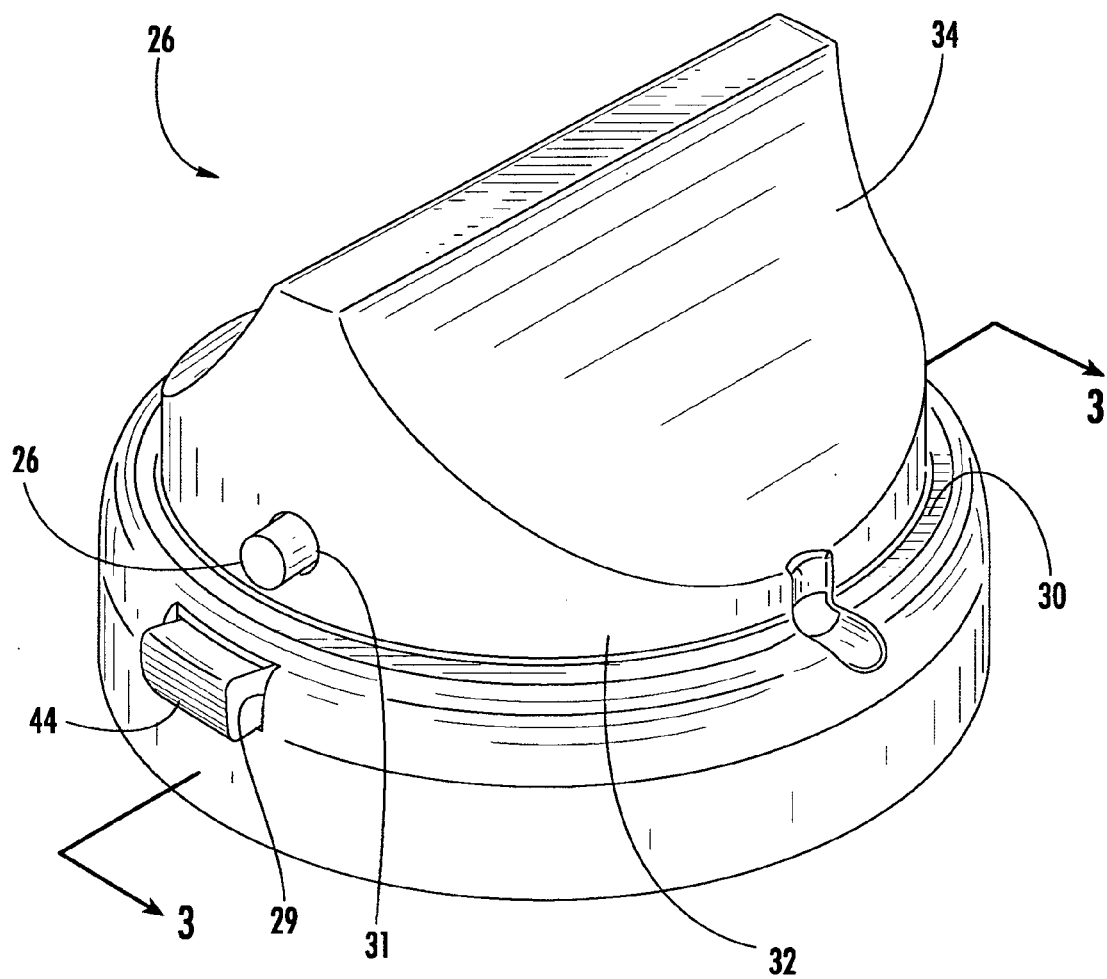
FIG. 2 is a close-up perspective view of the base of the preferred embodiment of the present invention.

Referring now to FIG. 2, the base member 26 of the present invention has a foot portion 28. On the surface of the foot portion 28 are one or more button apertures 29. Curving inwardly from the foot portion 28 is an annular seat 30. Extending from the annular seat 30 is a neck portion 32. The neck portion 32 is sized to snuggly fit into the bottom end of the body member 12. On the outer surface of the neck portion 32 are one or more lock apertures 31. As will be described below, locking pins 46 (only one is visible in FIG. 2) are retractably positioned through lock apertures 31 in the base 26. Extending from the neck portion 32 is a seed deflector 34 for guiding the bird seed 14 towards a feed access point 20 of the body member 12 and preventing accumulation of bird seed 14 in a location of the body member 12 that is unreachable by feeding birds. Although, the seed deflector is shown with a peak in the center with surfaces curving gently away to the neck portion 32, other configurations could be easily implemented, such as a U-shaped channel. Also, the seed deflector 34 can be either integrally formed with the base 26 or provided as a separate member for ease of manufacture and assembly.

Figure 3:
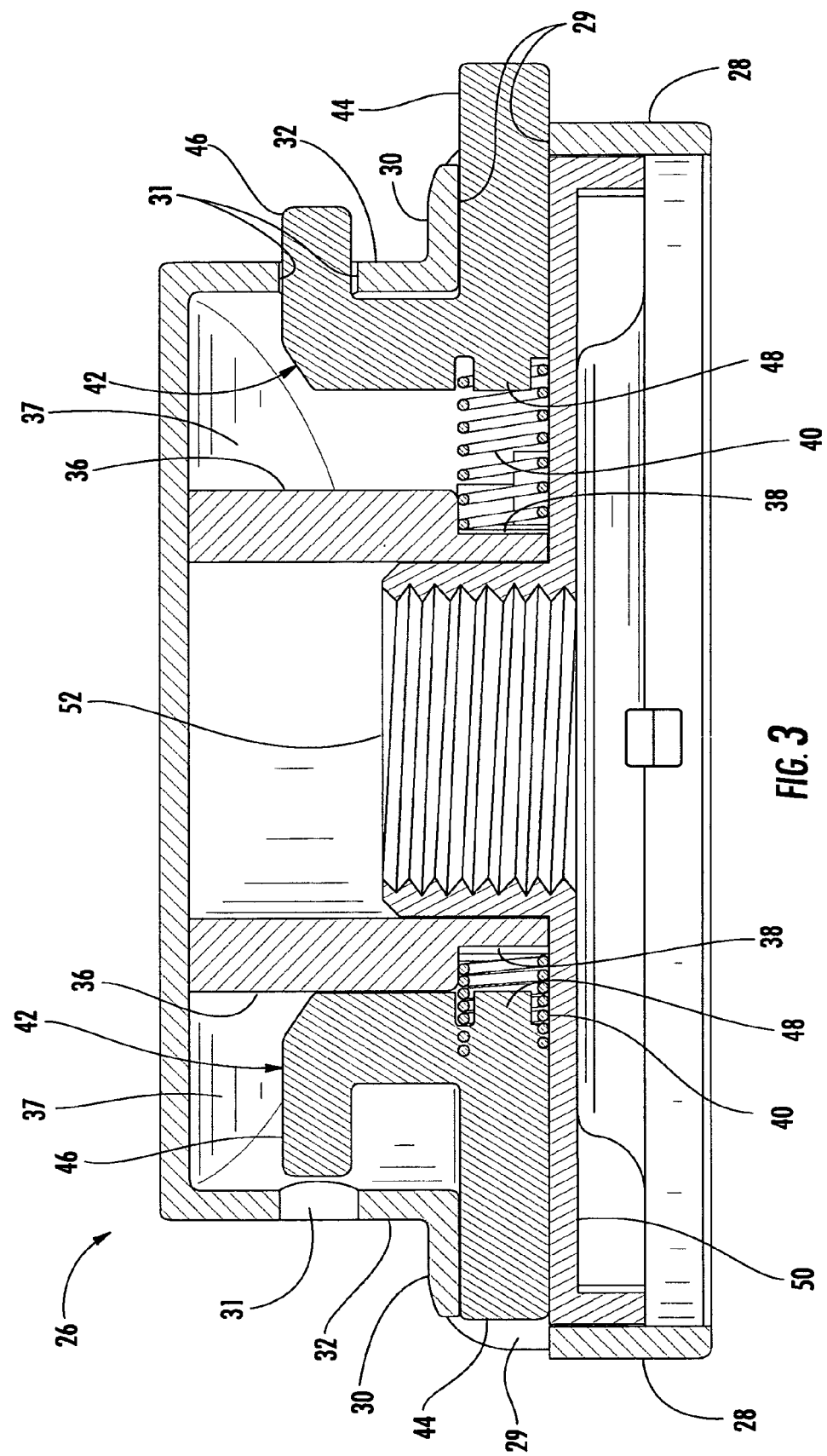
FIG. 3 is side cross-section view through line 3-3 of FIG. 2.
Figure 4:
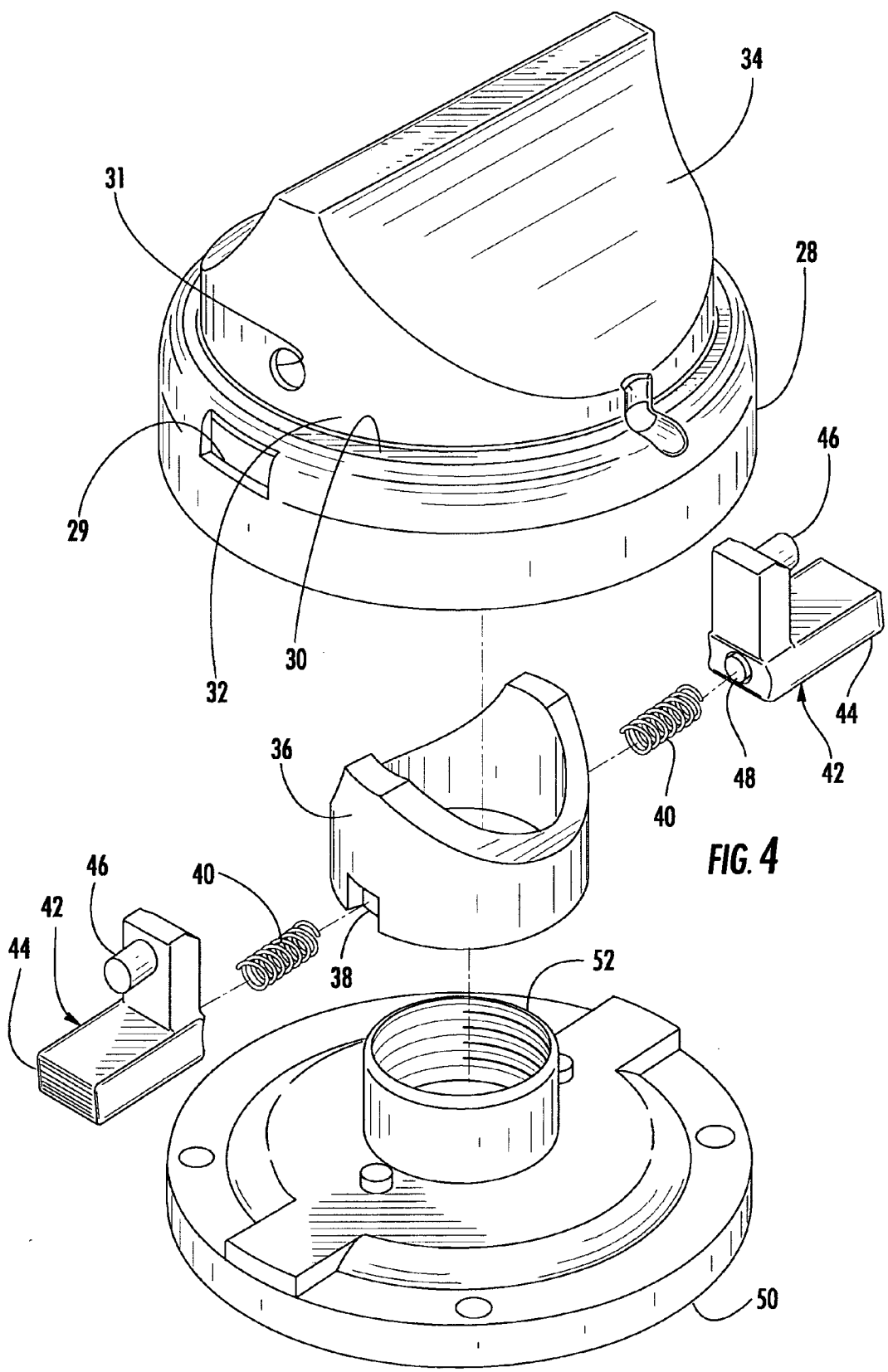
FIG. 4 is an exploded view of the preferred embodiment of the present invention.

Referring now to FIGS. 3 and 4, the base member 26 has an inner annular wall 36 having a seat 38 for one or more springs 40. Although coil-type springs are shown, other spring structures could easily be implemented. The inner annular wall 36, in conjunction with the inside surface of the neck portion 32 and foot portion 28 of the base member 26, also serves to define a well 37 for the lock members 42 to slide within. The lock members 42 have a button portion 44, a locking pin 46 and a spring seat 48. The locking pin 46 of the lock member 42 is slidably received within the lock aperture of the base member 26 and the corresponding button portion 44 of the lock member 42 is slidably received within a corresponding button aperture 29 of the base member 26. A spring 40 is received onto the spring seat of the locking member 42 and the seat 38 of the annular wall 36 to bias the locking member 42 outwardly.

A base plate 50 is secured to the bottom of the base member 26 to retain the locking members 42 in their respective positions. For example, glue, screws, rivets or other fasteners can be used to attach the base plate 50 to the base member 26. Optionally, the base plate 50 may be adapted to be mounted on a pole if the owner of the bird feeder 10 desires to position the bird feeder 10 in a location lacking suitable trees or other mounting points from which to attach the bail to. Preferably, the base plate 50 has threaded structure 52 from which the bird feeder may be attached, but other structures may be used that are well known in the art.

Figure 5:
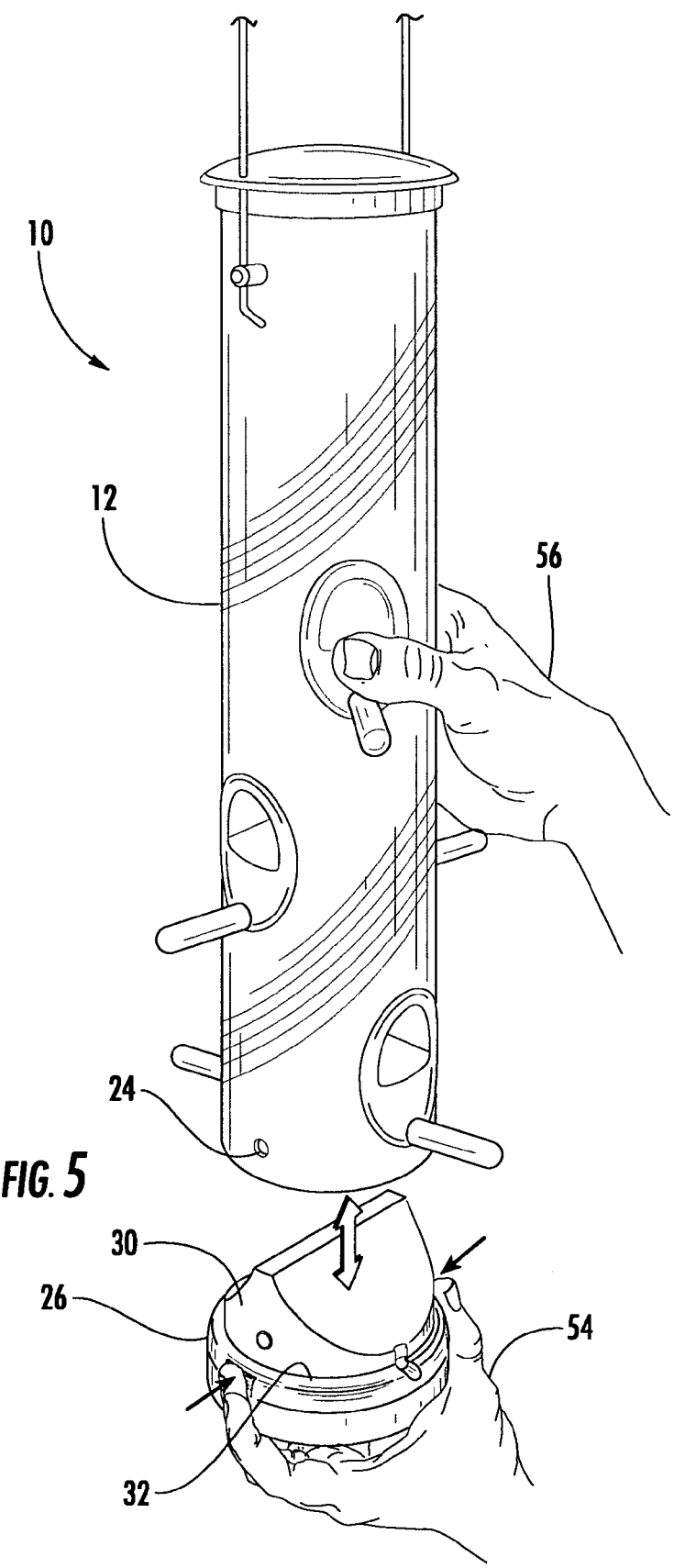
FIG. 5 is a partial cross-sectional perspective view of the base member being maneuvered for attachment to the tubular body member.
Figure 6:
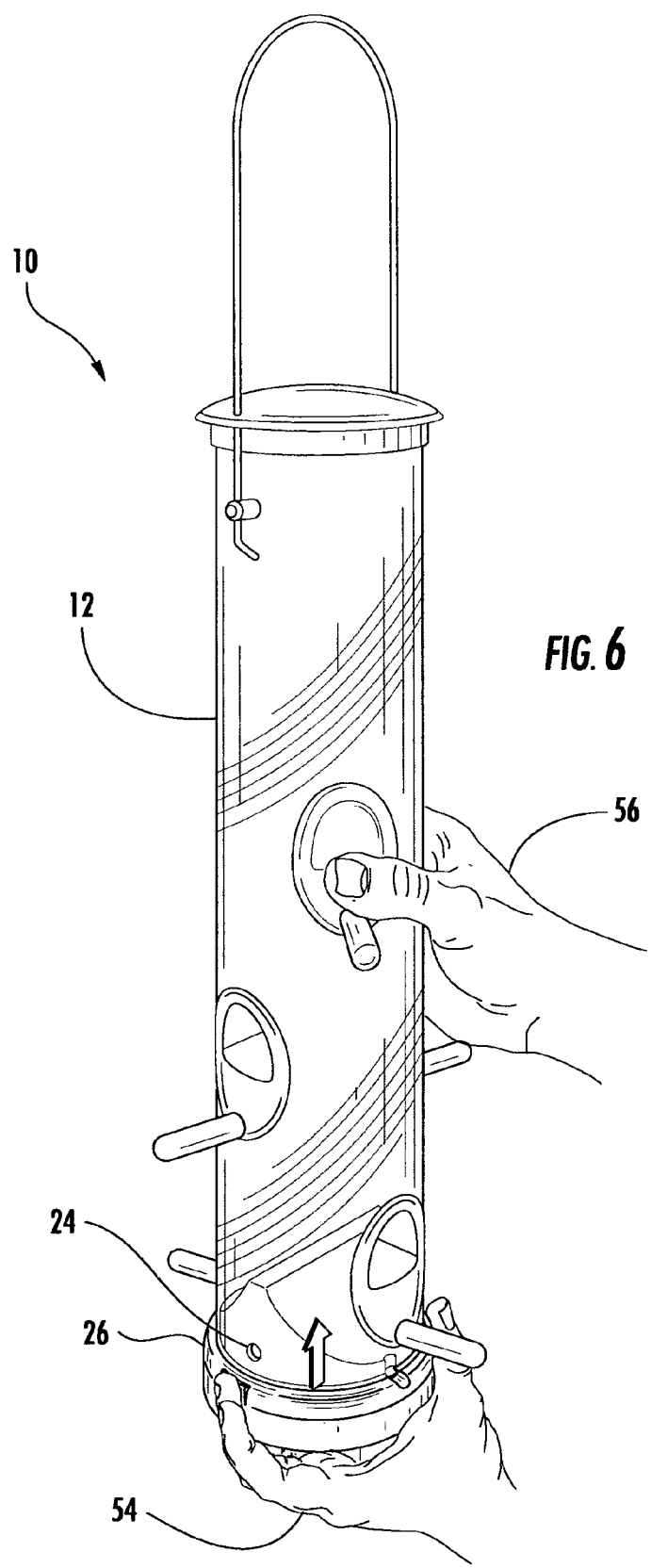
FIG. 6 is a partial cross-sectional perspective view of the base member being attached to the tubular body member.

Referring to FIGS. 5 and 6, the operation of the preferred embodiment of the present invention is shown. As seen in FIG. 5, with one hand 54, the operator (not shown) squeezes the button portions 44 of the locking members 42, thus biasing the springs 40 and forcing the locking members 42 inwardly. As the locking members 42 are forced inwardly, the locking pins 46 are drawn inwardly into the base member 26 through the corresponding lock apertures 31.

With the other hand 56, the operator maneuvers the body member 12 over the base member 26 aligning the bottom end of the body member 12 with the neck portion 32 of the base member 26. The operator then places the body member 12 over the neck portion 32 of the body member 26 until it rests against the annular seat 30. If not already aligned, the operator then twists the body member 12 (or base member 26) to align the lock eyes 24 on the body member 12 with the lock apertures 31 on the base member 26. The operator then releases the button portions 44 of the locking members 42 to secure the base member 26 to the body member 12 defining a side wall. Releasing the locking members 42 causes the springs 40 to force the locking members 42 outwardly, thus, causing the locking pins 46 of the locking member to protrude through the lock apertures 31 of the base member 26 and the corresponding lock eyes 24 of the body member 12. As in FIG. 6, the base member 26 is releasably secured in place and the feeder 10 is then suitable for use in a normal fashion.

For cleaning, the process is reversed to remove the base member 26. The buttons 44 are depressed to retract locking pins 46 to permit the base member 26 to be separated from the tubular body member 12. Thus, access to the interior of the tubular body member 12 and the base member 26 can be achieved for easy cleaning thereof.

Although the present invention has been described with reference to a preferred embodiment wherein the neck portion 32 of the base member 26 is inserted into the bottom end of the body member 12, and the locking members 42 protrude outwardly to secure the base member 26 to the body member 12; other variations could be easily implemented. For instance, the body member 12 could be inserted into the base member 26 instead of the neck portion 32 (and seed deflector 34) of the base member 26 being inserted into the body member 12. The locking members 42 could also be easily arranged to protrude inwardly rather than outwardly. Similarly, other means could be used rather than springs 40 to bias the locking members 42. The concept of the present invention is to cover all of these various bases and locking mechanisms for bird feeders.

Also, the side wall of the tubular body member 12 may have a recessed seat (not shown) rather than a complete pass-through aperture in the form of lock eyes 24. Such alternatives are considered to be within the scope and intent of the present invention.

Therefore, while there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A bird feeder, comprising:
a tubular body member having an open bottom end and a side wall and at least one aperture near the open bottom end of the tubular body member in the side wall thereof, said tubular body member having feed ports capable of dispensing bird feed therethrough;
at least one perch extending from the bird feeder and adjacent to the feed ports;
a base member interfittingly engaged the open bottom end of the tubular body member;
at least one spring-biased locking member biased outwardly from the base member, the at least one spring-biased locking member configured and arranged to engage the at least one aperture on the tubular body member to releasably secure the base member to the open bottom end of the tubular body member; and
at least one button interconnected to the at least one spring-biased locking member; the at least one button being configured to be pressable by a user to disengage the at least one spring-biased locking member from the at least one aperture.

2. The bird feeder of claim 1, wherein the at least one aperture on the tubular body member is two apertures and the least one locking members on the base member is two corresponding locking members on the base member.

3. The bird feeder of claim 1, further comprising a bail connected to the body member.

4. The bird feeder of claim 1, wherein the base member is adapted to be mounted on a support pole.

5. The bird feeder of claim 1, wherein the base member further comprises a seed deflector extending therefrom.

6. A removable base for a bird feeder including a tubular body member with an open bottom end and at least one aperture near said bottom end, said tubular body member having feed ports capable of dispensing bird feed therethrough and perches configured and arranged for birds to land thereon, said base comprising:
a bottom portion;
a top portion extending from the bottom portion, said top portion interfittingly engaging with the bottom end of the tubular body member; and
at least one outwardly spring-biased locking member having a locking pin, the locking pin slidably received within the aperture of the tubular body member to maintain the base and the open bottom end of the tubular body member releasably secured to one another; and
at least one button interconnected to the at least one spring-biased locking member; the at least one button being configured to be pressable by a user to disengage the locking pin from the at least one aperture.

7. The base of claim 6, wherein the at least one locking member is two locking members.

8. The base of claim 6, wherein the base member is adapted to be mounted on a support pole.

9. The base of claim 6, wherein the base member further comprises a seed deflector extending therefrom.

* * * * *